United States Patent
Jones

[15] 3,655,455
[45] Apr. 11, 1972

[54] METHOD FOR THE MANUFACTURE OF BATTERIES

[72] Inventor: Kenneth R. Jones, Mequon, Wis.

[73] Assignee: Globe-Union Inc., Milwaukee, Wis.

[22] Filed: Aug. 16, 1968

[21] Appl. No.: 777,932

Related U.S. Application Data

[62] Division of Ser. No. 383,159, July 16, 1964, Pat. No. 3,431,148.

[52] U.S. Cl............................................136/175, 136/166
[51] Int. Cl. ......................................................H01m 31/00
[58] Field of Search..................136/175, 176, 166, 112–114, 136/90, 100, 91, 6, 83; 264/277, 272

[56] References Cited

UNITED STATES PATENTS

| | | | |
|---|---|---|---|
| 2,464,029 | 3/1949 | Ehrman | 264/277 X |
| 3,120,572 | 2/1964 | Shannon | 264/277 X |
| 3,196,049 | 7/1965 | Schilke | 136/90 |
| 3,185,592 | 5/1965 | Kirk et al. | 136/100 |

*Primary Examiner*—Anthony Skapars
*Attorney*—Pendleton, Neuman, Williams & Anderson

[57] ABSTRACT

A method of encasing batteries where the battery electrodes are assembled with spacers maintaining the electrodes in a spaced relationship to define an electrolyte cavity. In practicing the method, the electrode assembly is immersed in a body of molten casing material whereby the casing material solidifies to form a web between the electrodes and define the electrolyte cavities. The supports for the assembly during immersion extend across the electrodes and are coated with casing material so that upon removal of the supports transverse tubular manifolds are defined. A single port to the manifold and the plurality of electrolyte cavities is also provided upon removal of the supports.

6 Claims, 5 Drawing Figures

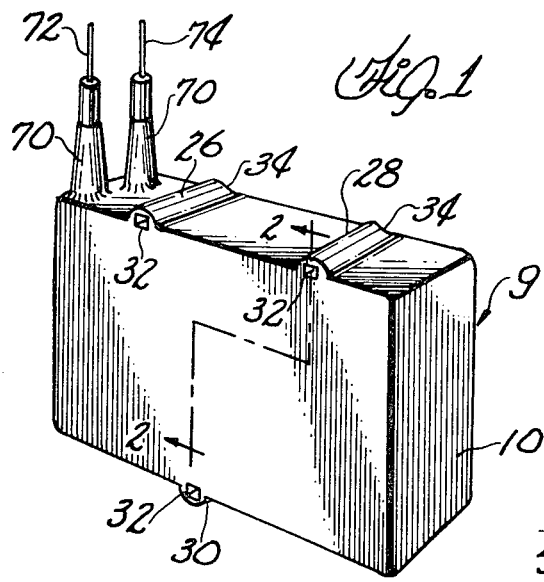
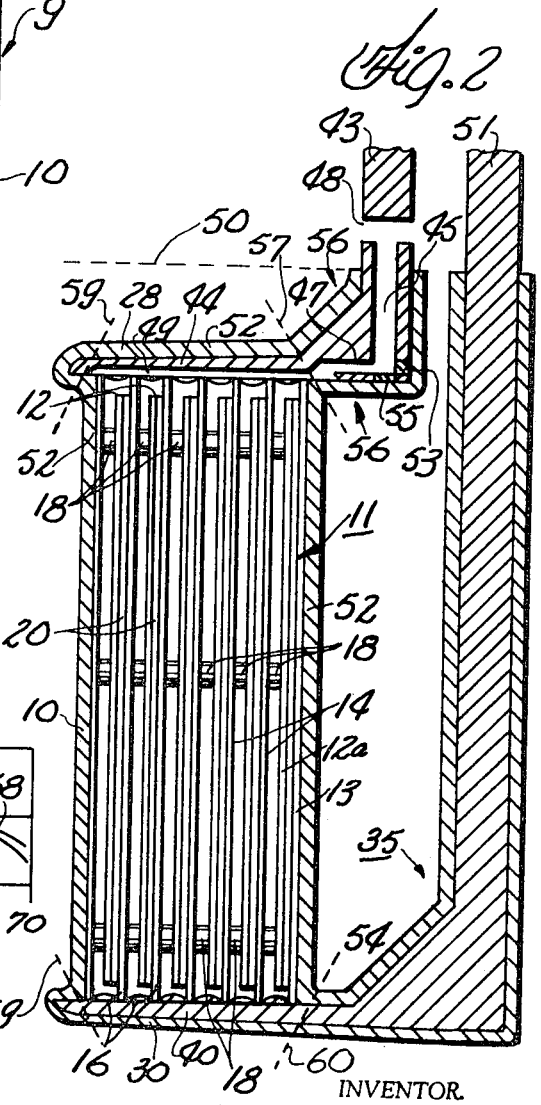
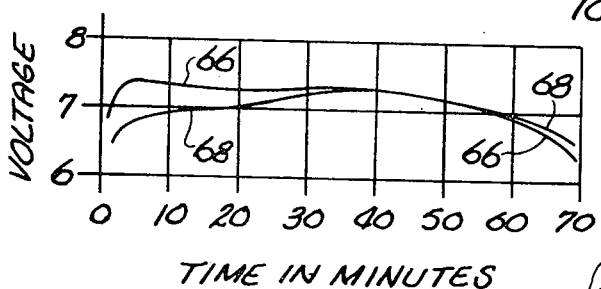

INVENTOR.
Kenneth R. Jones

METHOD FOR THE MANUFACTURE OF BATTERIES

This application is a division of application Ser. No. 383,159, filed July 16, 1964, now U.S. Pat. No. 3,431,148.

This invention relates to an improved battery construction and to a method and an apparatus especially useful in the manufacture of said improved battery construction. One particular battery to which the teachings of this invention are especially applicable is that disclosed and claimed in a copending application of Jones et al., Ser. No. 287,171, filed May 29, 1963, now abandoned and assigned to the same assignee as the instant application.

The batteries of said copending application will be described hereinafter as an exemplary form to which the instant invention is applied. Such batteries employ an anode of magnesium and a cathode of silver chloride in a battery cell in which the electrolyte is, for example, sea water. The cell is activated by immersion of the unit into sea water, provision being made to permit the sea water to enter the cell and to act as an electrolyte, and also to pass through the cell to remove products of the battery action, and, in some cases, to provide control of thermal conditions within the battery.

Such deferred action batteries are normally composed of a plurality of cells, and the cells are customarily separated by means of impervious but electrically conducting partitions, each separating the anode of one cell from the cathode of an adjacent cell, electrically connecting the electrodes of the cells in series, and preventing electrolyte from migrating between the cells.

In a preferred form of the battery construction, a plurality of cells of the type described above are interconnected as an assembled unit and encased in a plastic casing material which is applied to the exterior of the assembled unit by dipping the same into a molten supply of the casing material. As taught in the aforementioned Jones et al. application, the temperature of the assembled battery unit prior to dipping is below the setting temperature of the casing material, whereby the liquid casing material which comes into intimate contact with the relatively cool battery assembly becomes more viscous and forms a thin viscous skin about the battery. This permits the build-up of additional material to form the casing while preventing contamination of the battery interstices. The material hardens after withdrawal of the dipped unit to form an integral and homogeneous casing surrounding the battery unit.

In prior batteries of the deferred action type, a plurality of ports were formed in the casing to provide for ready access of sea water to the cells when the battery is immersed. It has been found, however, that the efficiency of the prior deferred action batteries and their life is adversely affected by leakage of electrical current between the cells, occurring in the vicinity of the ports provided in the casing. One factor in this leakage phenomena is the fact that the edges of the electrodes are exposed to a large body of sea water in the vicinity of the port, and the sea water therefore forms a relatively large cross-section, low resistance circuit interconnecting the various cells and electrodes of the battery. The present invention contemplates the reduction of the magnitude of the intercell leakage by providing hoods over the area in which the electrodes are exposed to the electrolyte, and thereby reducing the cross-sectional area of the path through which leakage current may pass between the battery cells, and consequently raising the leakage resistance.

This arrangement achieves the advantage of reducing intercell leakage and thereby improving the efficiency and lengthening the life of the battery, and also produces a more desirable flow of electrolyte through the cells and consequent improvement in the voltage-time characteristic.

The present invention also provides an improved method of forming a casing for a deferred action battery which has hoods defining manifolds integral with the casing and ports of reduced cross-sectional area.

The present invention also provides improved apparatus by which a casing with such manifolds and ports may be formed.

Accordingly, it is a principal object of the present invention to provide an improved integral casing for a battery having ports and manifolds adapted for the ingress and egress of electrolyte from the battery cells which have a smaller leakage cross-section than those heretofore known.

A further object of the present invention is to provide a casing for a multiple cell deferred action battery having passageways interconnecting the cells of the battery and integral hoods disposed over the passageways.

Another object of the present invention is to provide a method for forming a battery casing around the assembled components of a deferred action battery in such a manner as to provide ports for the ingress and egress of electrolyte which have a reduced leakage cross-section and integral hoods over the passageways.

Another object of the present invention is to provide improved apparatus for performing the process of the invention.

One advantage which is derived from the practice of the present invention is the material improvement in the voltage-time characteristic curve of the battery for various environments and particularly for conditions in which the electrolyte is maintained at a relatively low temperature, a circumstance which prevails when the battery is activated by cold sea water. This improvement is exemplified by an output voltage under constant current conditions, exhibiting a gradually rising slope during the life of the battery until just prior to exhaustion of the battery. While an understanding of the underlying theory for this characteristic is not essential to a utilization of the principle, it is believed that this advantageous voltage characteristic is achieved because the reduced cross-sectional area of the electrolyte ports reduces the flow of electrolyte through the ports so that the internal temperature of the battery rises and the salt content of the electrolyte rises as a result of the chemical reaction. The result of these phenomena is that the conductivity of the electrolyte is increased, thereby reducing the IR drop of the battery itself. In addition, the increase in operating temperature of the battery also increases the open circuit voltage of the battery.

The effect of these advantages is to provide a battery which more nearly approaches a characteristic curve in which the output voltage is constant irrespective of changes in various environmental conditions, in this case, ambient temperature.

Other objects and advantages of the present invention will be manifest from an examination of this description, the accompanying claims, and the drawings.

In one embodiment of the present invention a deferred action battery is provided, having a battery casing surrounding the electrode assembly of the battery, with one or more passageways or conduits disposed along the lower and upper edges of the electrodes of the cells within the battery, and terminating at each end in a port provided for ingress and egress of electrolyte, respectively. The passageways are defined by hoods formed integrally with the casing.

In another aspect of the present invention, an improved method and apparatus for forming such a battery casing are provided.

Reference will now be made to the accompanying drawings in which:

FIG. 1 is a perspective view of a battery constructed in accordance with the present invention;

FIG. 2 is a cross-sectional view taken along the section 2—2 of FIG. 1, illustrating the electrode assembly just subsequent to dipping in the casing material and with the manufacturing apparatus still in place;

FIG. 5 is a graphical illustration of the improved voltage-time characteristic of a battery constructed in accordance with the present invention.

Figure 3:
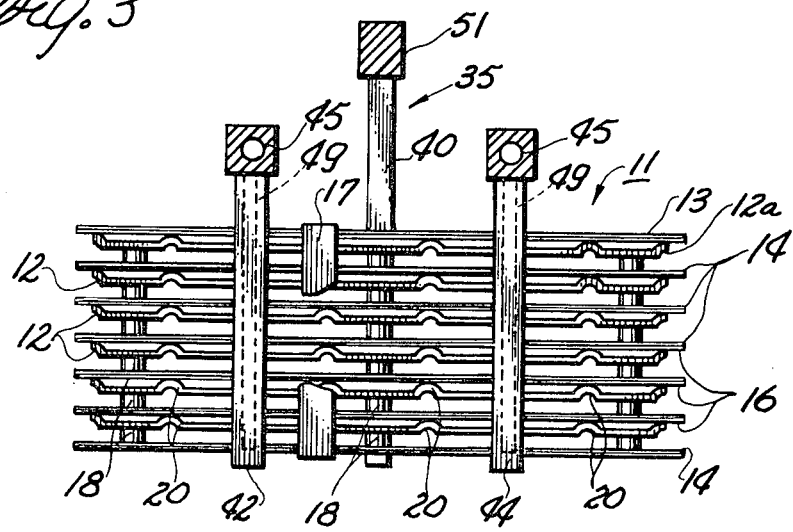
FIG. 3 is a top view of the battery assembly and apparatus prior to dipping in the casing material.

Referring now to the drawings, there is shown a battery construction 9 similar to that described and claimed in the aforementioned Jones et al. application, with a modified casing 10 best illustrated in FIG. 1. As shown in FIGS. 2 and 3, the battery comprises an electrode assembly 11, which includes a plurality of cathodes 12, anodes 14 and partitions 16, the partitions separating adjacent anodes 14 and cathodes 12. The partitions 16 are formed of impermeable, electrically conductive material, so that they serve to prevent electrolyte from flowing between the various cells of the battery and also to electrically connect the several cells of the battery in series. A plurality of small insulating spacers 18 operate to maintain a given separation between the cathode 12 and anode 14 of each respective cell, and each of the cathodes 12 is provided with a plurality of embossed or protuberant portions 20 for the purpose of increasing electrolyte circulation in the non-reactive areas between the cathode and the spacer for better temperature stability and in the reactive space between anode and cathode to maintain the cell areas substantially free from undissolved salts which may be generated during the battery reaction. And end plate 13 is disposed in contact with the endmost cathode 12a, and serves as an electrical connector to which a lead may be attached.

Figure 4:
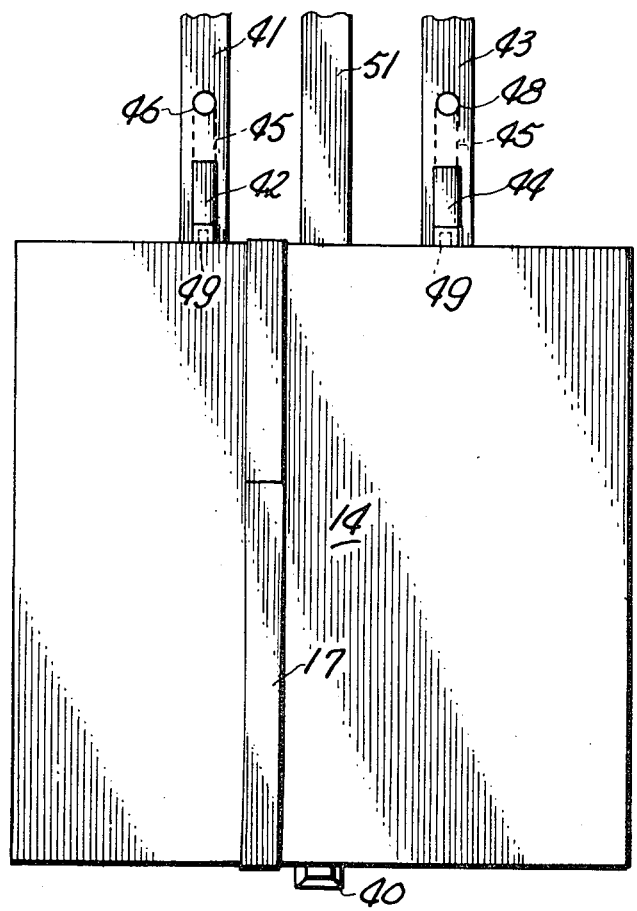
FIG. 4 is a side view of the electrode assembly and apparatus of FIG. 3.

The electrode assembly 11 is preferably secured together, at least temporarily, with a strip of insulating tape 17, shown in FIG. 4 and partially shown in FIG. 3, which insures that the components of the electrode assembly remain in fixed relationship, until the casing 10 is formed.

The casing 10 which surrounds the electrode assembly 11 is formed by dipping the assembly into a supply of molten casing material, which is preferably a plastic compound, and preferably one which is relatively rigid at room temperature but fluid at temperatures not greatly in excess of ambient ranges. One satisfactory material which is employed is cellulose acetate butyrate. A thin inner surface film of compound congeals on contact with the relatively cool electrode assembly 11, and an additional thickness sets on the outer surface upon removing the assembly from the compound supply and cooling the unit.

As shown in FIG. 1, the basic body of the casing 10 also includes integral hoods 26, 28 and 30, which are disposed over the openings in the casing 10 communicating with edges of the electrode assembly. Each of the hoods 26, 28 and 30 are open at both ends to form ports 32 and 34 through which electrolyte may pass into or from the interior of the casing 10. The passageways of conduits, defined by hoods 26 and 28, comprise small manifolds and extend between the ports 32 and 34. The manifolds define openings at the edges of all of the cells of the battery, and therefore permit some intercell leakage to occur. However, the presence of the hoods over these areas limit the cross-sectional area over which such leakage current may flow, which thereby maintains the resistance of the leakage path at a relatively high level and consequently minimizes energy wasted by this leakage. A reinforcing stem 70 for the terminal wires 72 and 74 is also formed integrally with the casing 10 and the hoods 26, 28 and 30.

FIGS. 2, 3 and 4 illustrate portions of apparatus 35, employed for supporting and submerging an electrode assembly 11 into the molten casing material. The jig 35 is provided with a support bracket 51, with a centrally disposed bottom arm 40 adapted to support the weight of the assembled battery during dipping. Two or more bottom arms 40 may be employed, if desired. Two upper arms 42 and 44, secured to supporting members 41 and 43, straddle the lower arm 40 to hold the assembly in position on the lower arm 40. Each of the arms 40, 42 and 44 extends entirely across one side of the assembly 11, and engages an edge of each of the electrodes thereof. The supporting members 41 and 43 for the upper arms 42 and 44 are provided with vents 46 and 48 connected through bores 45 and 47 to grooves 49 extending along the lower surface of each of the upper arms 42 and 44. The air trapped in the electrode assembly 11 during dipping is permitted to expand and escape through the vents 46 and 48, which remain above the level of the casing material at all times. Thus a uniform, smooth casing results which is free of blisters or bubbles. The ends of the bores 45 and 47 are preferably closed by plugs 53 and 55 to prevent the casing material from entering the bores which would seal the bores and prevent the venting of air from the battery. The support members 41 and 43 for the upper arms 42 and 44 are preferably adjustably mounted by a clamp (not shown) on the support bracket 51 to permit a degree of adjustability so that the jig 35 may be used on various sizes of batteries and to clamp the assemblies in place for dipping.

During dipping, the jig 35 and assembly 11 are dipped into a supply of molten casing material, the level of which is indicated at 50 in FIG. 2. The entire electrode assembly and jig assembly are therefore coated with casing material up to the level 50, and when the jig and the electrode assembly are withdrawn, a coating 52 surrounds the assembly 11 and that portion of the jig 35 which was submerged in the casing material.

The casing material is then cut in the area 54 adjacent the lower arm 40, and preferably along the line 60, and in the area 56, adjacent each of the upper arms 42 and 44, and preferably along the line 57, whereby the completed battery, together with its surrounding casing, may easily be slid longitudinally off of the arms 40, 42 and 44, to free the battery from the jig. The apertures left by the removed jig arms comprise the vent holes 34. The arms 40, 42 and 44 have tapering thicknesses to facilitate removal of the battery from the jig 35. Thereafter, the coating 52 of casing material adjacent the tip end of the arms 40, 42 and 44 is preferably cut back flush with the side walls of the casing, preferably along the lines 59, to form the ports 32 on the other side of the battery, as illustrated in FIG. 1.

The process described above results in a battery casing in which all portions are integrally formed, including the hoods 26, 28 and 30, and the reinforcing stem 70.

Referring now to the graph illustrated in FIG. 5, two voltage-time characteristic curves of a battery constructed in accordance with the present invention are illustrated. In both curves, the current is maintained constant. The design maximum voltage of the battery is 7.5 v. and the design minimum is 6.25 v. The two curves differ in that the curve 66 represents the operation of the battery with a relatively warm electrolyte, while the curve 68 represents the operation of the battery when a cold electrolyte is used. In the curve 66, the voltage of the battery rises from zero to a maximum voltage within a very short time, and then falls at a relatively constant rate until the minimum voltage of 6.25 v is reached.

In the other characteristic curve 68, which applies for a cold electrolyte, the output voltage quickly rises above the minimum voltage, and then continues to rise over a substantial portion of the life of the battery, and eventually becomes equal to output voltage indicated by the warm electrolyte curve. This mode of operation contrasts sharply with that of previously known batteries, in which the output voltage for a cold electrolyte condition remains substantially below the warm electrolyte voltage over the entire life of the battery. It is believed that the improved characteristic is due to warming the electrolyte more effectively by virtue of the decreased cross-sectional area of the ports 32 and 34, so that the heat generated within the battery during use cannot be dissipated as effectively. An additional advantage is that the reduction in intercell leakage improves the life and capacity of the battery.

In the foregoing, the present invention has been sufficiently described as to enable those skilled in the art, by applying current knowledge, to adapt the same for use under varying conditions without departing from the essential items of novelty involved, which are intended to be defined and secured by the appending claims.

What is claimed is:

1. A method of forming a casing for a battery comprising the steps of assembling a plurality of similar electrodes into a rectilinear assembly having generally aligned edges and spacer means disposed between adjacent ones of said electrodes to define a space between the edges thereof, disposing an elongate interference member transversely across the aligned edges of said assembly and in contact therewith, submerging said assembly and said interference member in a body of molten casing material which is substantially rigid at room temperatures whereby said casing material directly engages said edges, permitting said assembly to remain in said molten casing material for a predetermined period of time sufficient to permit a layer of said material to adhere to said edges and form a web between said edges defining said spaces, withdrawing said electrode assembly and said interference member with said layer of said material from said body of material, permitting said layer to solidify, and removing said interference member from said electrode assembly to define a generally tubular manifold between said edges and said layer.

2. The method of forming a casing for a battery as defined in claim 1 wherein said casing material comprises cellulose acetate butyrate.

3. The method of claim 1, wherein said interference member is a generally horizontal cantilever member in engagement with said edges which is supported at one end from an upwardly extending support, said method including the step of severing said layer around said member at a location remote from said electrode assembly.

4. A method of forming a casing for a battery comprising the steps of assembling a plurality of similar electrodes into a rectilinear assembly having generally aligned edges and spacer means disposed between adjacent ones of said electrodes to define a space between the edges thereof, disposing an elongate interference member transversely across the aligned edges of said assembly and in contact therewith, submerging said assembly and said interference member in a body of molten casing material which is substantially rigid at room temperatures whereby said casing material directly engages said edges, permitting said assembly to remain in said molten casing material for a predetermined period of time sufficient to permit a layer of said material to adhere to said edges and form a web between said edges defining said spaces, withdrawing said electrode assembly and said interference member with said layer of said material from said body of material, permitting said layer to solidify, removing said interference member from said electrode assembly to define a generally tubular manifold between said edges and said layer, and removing a portion of said casing material adjacent the ends of said tubular manifold to define a port at each end of said manifold.

5. A method of forming a casing for a battery comprising the steps of assembling a plurality of similar electrodes into a rectilinear assembly having ends comprising generally aligned edges and spacer means disposed between adjacent ones of said electrodes to define a space between the edges thereof, disposing a plurality of elongate interference members transversely across the aligned edges of said assembly and in contact therewith, said assembly being supported between said interference members, submerging said assembly and said interference members in a body of molten casing material which is substantially rigid at room temperatures whereby said casing material directly engages said edges, permitting said assembly to remain in said molten casing material for a predetermined period of time sufficient to permit a layer of said material to adhere to said edges and form a web between said edges defining said spaces, withdrawing said electrode assembly and said interference members with said layer of said material from said body of material, permitting said layer to solidify, and removing said interference members from said electrode assembly to define a generally tubular manifold between said edges and said layer.

6. The method of claim 5, wherein said interference members include open channel portions engaging said edges whereby fluid communication is maintained between the interior of said casing and the exterior of said body when said assembly is submerged in said body.

* * * * *